US009805232B2

(12) United States Patent
Sample et al.

(10) Patent No.: US 9,805,232 B2
(45) Date of Patent: Oct. 31, 2017

(54) SYSTEMS AND METHODS FOR DETECTING HUMAN-OBJECT INTERACTIONS

(71) Applicant: Disney Enterprises, Inc., Burbank, CA (US)

(72) Inventors: Alanson Sample, Pittsburgh, PA (US); Hanchuan Li, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/919,617

(22) Filed: Oct. 21, 2015

(65) Prior Publication Data

US 2017/0116446 A1    Apr. 27, 2017

(51) Int. Cl.
*H04Q 5/22* (2006.01)
*G06K 7/10* (2006.01)
*G06Q 30/02* (2012.01)

(52) U.S. Cl.
CPC ..... *G06K 7/10366* (2013.01); *G06Q 30/0251* (2013.01)

(58) Field of Classification Search
CPC ............. G06K 7/10366; G06Q 30/0251
See application file for complete search history.

(56) References Cited

U.S. PATENT DOCUMENTS

| 8,279,112 | B2 * | 10/2012 | Carrick | G01S 5/14 340/10.1 |
| 8,531,273 | B2 * | 9/2013 | Overhultz | G06K 7/10316 340/10.1 |
| 8,890,684 | B2 * | 11/2014 | Tkachenko | G01S 13/876 340/539.11 |
| 9,330,468 | B2 * | 5/2016 | Shaw | G06T 7/0048 |
| 2006/0273909 | A1 * | 12/2006 | Heiman | A63H 33/00 340/572.7 |
| 2008/0146980 | A1 * | 6/2008 | Rousso | A61H 11/02 601/152 |
| 2009/0210940 | A1 * | 8/2009 | Dean | G06F 21/35 726/19 |
| 2010/0156651 | A1 * | 6/2010 | Broer | G01S 13/74 340/670 |
| 2010/0253468 | A1 * | 10/2010 | Devecka | A63H 33/22 340/3.1 |

(Continued)

OTHER PUBLICATIONS

Bao et al "Activity Recognition from User-Annotated Acceleration Data" 2004, pp. 1-17.

(Continued)

*Primary Examiner* — Quang D Pham
(74) *Attorney, Agent, or Firm* — Farjami & Farjami LLP (57) ABSTRACT

There are provided systems and methods for a user interaction with an object having a wireless tag with an antenna. An example system includes a memory storing a tag processing software, and a hardware processor executing the tag processing software to receive a signal from the wireless tag of the object via the antenna, the signal including a wireless tag identification (ID) uniquely identifying the wireless tag, identify the object using the wireless tag ID, extract one or more communication channel parameters from the signal, determine the user interaction with the object based on the one or more communication channel parameters extracted from the signal.

14 Claims, 8 Drawing Sheets

(56) References Cited

U.S. PATENT DOCUMENTS

| | | | | |
|---|---|---|---|---|
| 2010/0309017 | A1* | 12/2010 | Ramchandran | G01S 3/74 340/8.1 |
| 2012/0062381 | A1* | 3/2012 | Liu | G01S 11/06 340/572.1 |
| 2012/0293307 | A1* | 11/2012 | Djuric | G06K 7/10465 340/10.2 |
| 2012/0319819 | A1* | 12/2012 | Tkachenko | G01S 13/876 340/10.1 |
| 2013/0084801 | A1* | 4/2013 | Royston | G06K 7/015 455/41.1 |
| 2014/0062728 | A1* | 3/2014 | Soto | G01S 7/415 340/937 |
| 2014/0113560 | A1* | 4/2014 | Graube | H04B 7/26 455/41.2 |
| 2014/0167920 | A1* | 6/2014 | Kamiya | G01S 13/58 340/10.1 |
| 2015/0042795 | A1* | 2/2015 | Tsuria | A63F 1/00 348/143 |
| 2015/0199890 | A1* | 7/2015 | Hewett | G08B 13/2451 340/572.1 |
| 2016/0054804 | A1* | 2/2016 | Gollakata | G06F 3/017 345/156 |

OTHER PUBLICATIONS

Chang et al "LIBSVM: A Library for Support Vector Machines" 2011, pp. 1-27.

Fishkin et al. "I Sense a Disturbance in the Force: Unobtrusive Detection of Interactions with RFID-tagged Objects" 2004, pp. 1-15.

Hodges et al. "Assessing and Optimizing the Range of UHF RFID to Enable Real-World Pervasive Computing Applications" 2007, pp. 280-297.

Nikitin et al. "Phase Based Spatial Identification of UHF RFID Tags" 2010, pp. 1-8.

Philipose "Large-Scale Human Activity Recognition Using Ultra-Dense Sensing" 2005, pp. 1-8.

Tapia et al. "Activity Recognition in the Home Using Simple and Ubiquitous Sensors" 2004, pp. 158-175.

Weiser "The Computer for the Twenty-First Century" 1991, pp. 1-9.

Buettner et al. "Recognizing Daily Activities with RFID-Based Sensors" 2009, pp. 1-10.

Dimitriou et al. "On Efficient UHF MD Coverage inside a Room" 2010, pp. 1-5.

Haché et al. "Wearable Mobility Monitoring Using a Multimedia Smartphone Platform" 2011, pp. 1-9.

Meli et al. "Enhancing the shopping experience through RFID in an actual retail store" 2013, pp. 1029-1035.

Parlak et al. "Detecting Object Motion Using Passive RFID a Trauma Resuscitation Case Study" 2013, pp. 2430-2437.

Ren et al. "Egocentric Recognition of Handled Objects: Benchmark and Analysis" 2009, pp. 1-8.

Ward et al. "Activity Recognition of Assembly Tasks Using Body-Worn Microphones and Accelerometers" 2006, pp. 1553-1567.

* cited by examiner

SYSTEMS AND METHODS FOR DETECTING HUMAN-OBJECT INTERACTIONS

BACKGROUND

Tracking interactions between humans and objects can provide valuable insight into various aspects of human activities. Wireless technology makes it possible to track objects to which wireless tags or transmitters are attached, and has conventionally been used for applications such as locating lost items, locating a set of keys, home monitoring, opening/closing of doors, and theft prevention.

SUMMARY

The present disclosure is directed to systems and methods for detecting human-object interactions, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
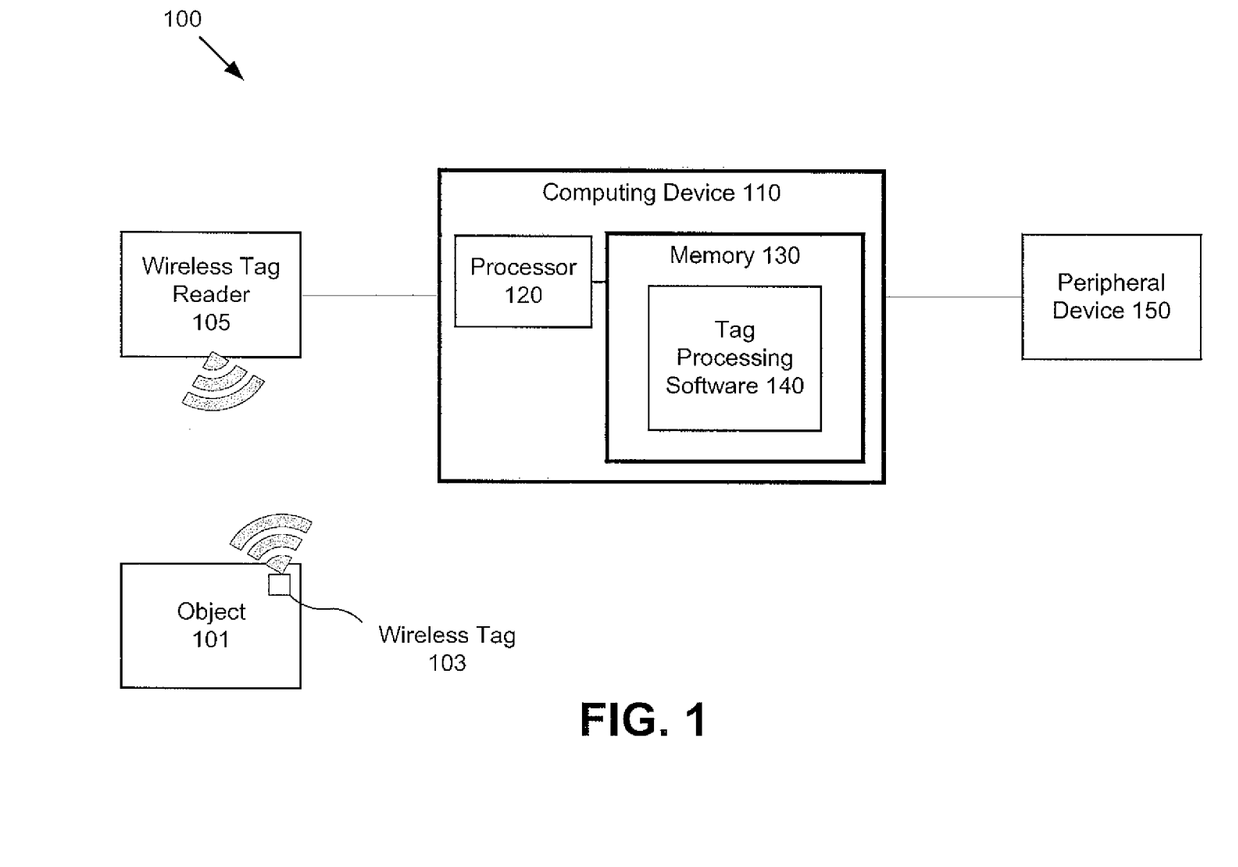
FIG. 1 shows a diagram of an exemplary system for detecting human-object interactions, according to one implementation of the present disclosure.

FIG. 1 shows a diagram of an exemplary system for detecting human-object interactions, according to one implementation of the present disclosure. System 100 includes object 101, wireless tag 103, wireless tag reader 105, computing device 110, and peripheral device 150. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes tag processing software 140.

Object 101 may be any moveable item with which a human might interact. In some implementations, object 101 may be a household object, a toy, or retail merchandise. In other implementations, object 101 may be a movable object such as a movable seat in an arena, or an article of clothing worn by a user. In some implementations, wireless tag 103 may be integrated with object 101, such as when wireless tag 103 is included during manufacturing of object 101, or wireless tag 103 may be adhered or attached to object 101, such as when wireless tag 103 is attached to object 101 using an adhesive.

Wireless tag 103 includes electronic circuitry that is packaged and contains electronically stored information. Wireless tag 103 may be attached or adhered to object 101 for identifying object 101 based on the electronically stored information in wireless tag 103. Wireless tag 103 may be an active wireless tag, a battery-assisted passive wireless tag, or a passive wireless tag. In some implementations, wireless tag 103 may be a radio frequency identification (RFID) tag, an ultra high frequency (UHF) RFID tag, a near field communication (NFC) transmitter, or a short distance radio transmitter. Short distance radio transmissions may operate in the unlicensed industrial, scientific and medical (ISM) band at 2.4-2.485 GHz using a spread spectrum, frequency hopping, full-duplex signal at a nominal rate of 1600 hops/sec. In some implementations, wireless tag 103 may be a BLUETOOTH® (BT) transmitter or a BT low energy (BLE) transmitter, where BLE transmitters include, among other things, BLUETOOTH® Smart and IBEACON™ transmitters. Wireless tag 103 may be a wireless device especially suited to be adhered to an object made of a certain material, such as a wireless tag designed for use with a glass object or a wireless tag designed for use with a metal object. Wireless tag 103 may include a unique tag identification (ID) that may be transmitted to or read by wireless tag reader 105. In some implementations, wireless tag 103 may include a writeable memory.

Wireless tag reader 105 may be a wireless device having a wireless receiver coupled to an antenna for reading or obtaining information from wireless tags, such as an RFID reader. An RFID Reader includes a radio frequency transmitter and receiver, which is able to read RFID tags, and may also be able to provide information for writing into RFID tags. In some implementations, wireless tag reader 105 may read passive or active wireless tags. Wireless tag reader 105 may transmit interrogator signals and receive authentication replies from wireless tag 103. Wireless tag reader 105 may be used to monitor and/or track a plurality of wireless tags in a room, building or any other environment, and may communicate with each wireless tag via a communication channel corresponding to each wireless tag. Each communication channel has its own particular characteristics and impairments. In some implementations, wireless tag reader 105 may detect wireless channel parameters, such as Received Signal Strength Indicator (RSSI), RF phase, and Doppler shift of wireless tag 103.

Tag processing software 140 is a computer algorithm stored in memory 130 for execution by processor 120 to receive and process information from wireless tag 103 received from wireless tag reader 105. In some implementations, tag processing software 140 may be a real-time data acquisition and classification program. For example, tag processing software 140 may observe changes in the physical layer signals of the communication channel between the RFID reader and wireless tag 103, such as an RSSI, an RF phase, and a Doppler shift of wireless tag 103. The physical layer is the first layer of the Open System Interconnection Model (OSI Model). The physical layer defines the means of transmitting raw bits between wireless tag 103 and wireless tag reader 105. Tag processing software 140 may use changes in the physical layer signals of the communication channel between the RFID reader and wireless tag 103 to determine changes in a position and/or orientation of object 101, or to infer a human interaction with object 101, etc.

Peripheral device 150 may be a speaker, a display, an interactive media device, such as a computer or tablet computer, or any other device that may process a signal from tag processing software 140. In some implementations, peripheral device 150 may be an environmental controller for controlling or adjusting an environmental setting, such as a light control, a volume control, a temperature control, etc.

Figure 2A:
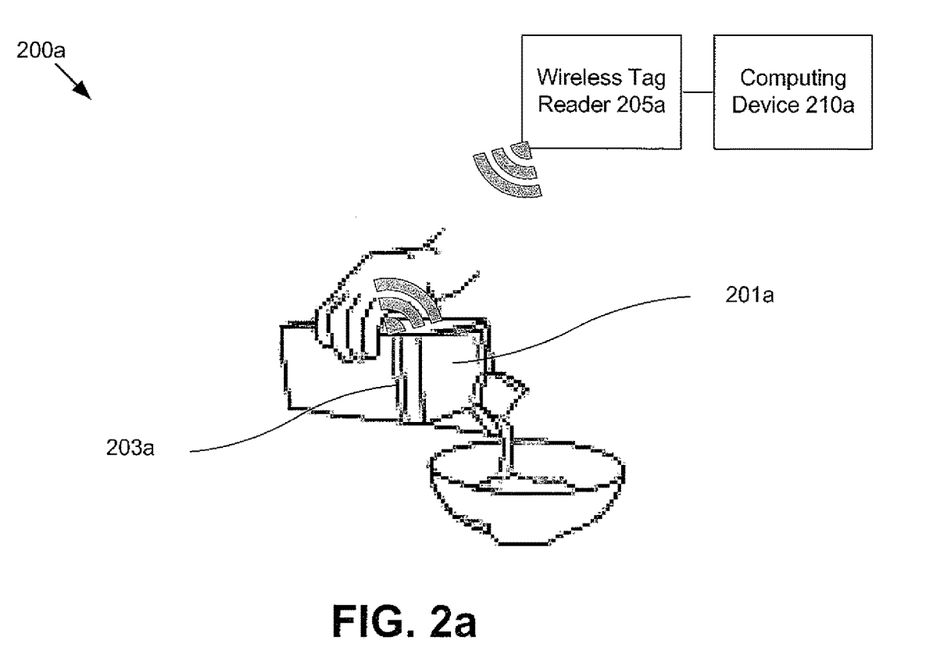
FIG. 2a shows a diagram of an exemplary household object for use with the system of FIG. 1, according to one implementation of the present disclosure.

FIG. 2a shows a diagram of an exemplary household object for use with the system of FIG. 1, according to one implementation of the present disclosure. As shown in diagram 200a, wireless tag 203a is attached to household object 201a, shown as a milk carton, and can be any object in the house to which wireless tag 103 may be attached. Wireless tag 203a may provide a tag ID or other information to wireless tag reader 205a using a wireless signal, which may send a signal, including data received from wireless tag 203a, to processor 120 for processing and analysis.

Figure 2B:
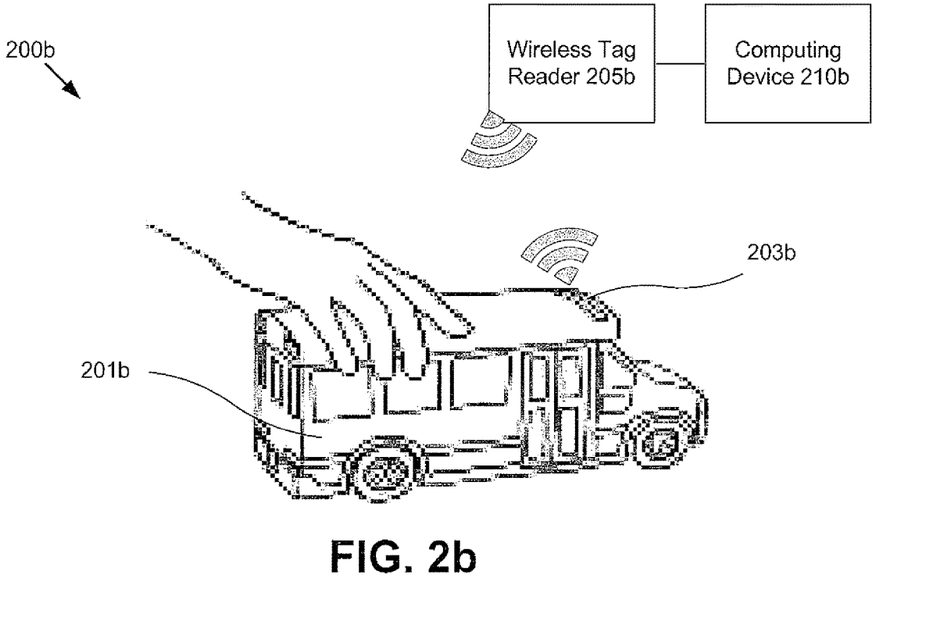
FIG. 2b shows a diagram of an exemplary toy for use with the system of FIG. 1, according to one implementation of the present disclosure.

FIG. 2b shows a diagram of an exemplary toy for use with the system of FIG. 1, according to one implementation of the present disclosure. As shown in diagram 200b, wireless tag 203b is attached to toy 201b, shown as an automobile. Wireless tag 203b may be attached to any type of toy, such as a stuffed animal, toy cars, building blocks, art supplies, such as crayons, markers, etc. Wireless tag 203b may transmit a signal to wireless tag reader 205b, which may send information obtained from the signal to processor 120 for processing and analysis.

Figure 2C:
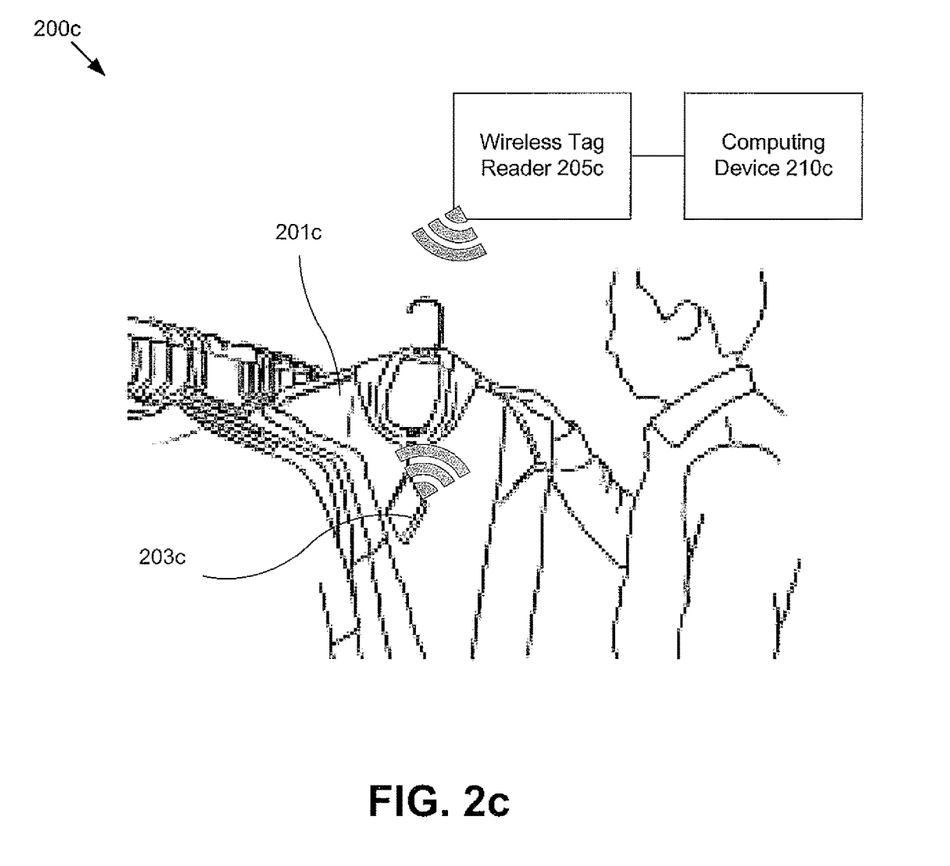
FIG. 2c shows a diagram of an exemplary retail merchandise for use with the system of FIG. 1, according to one implementation of the present disclosure.

FIG. 2c shows a diagram of an exemplary retail merchandise for use with the system of FIG. 1, according to one implementation of the present disclosure. As shown in diagram 200c, wireless tag 203c is attached to retail merchandise 201c, shown as a jacket. Wireless tag 203c may be attached to any retail merchandise with which a retail customer may interact, such as clothing, entertainment media, groceries, books, or any other retail item that may be found in a retail store. Wireless tag 203c may provide or transmit a signal to wireless tag reader 205c, which may send information obtained from the signal to processor 120 for processing and analysis. For example, based on a number of signals provided to wireless tag reader 205c, processor 120 may monitor and determine action(s) and/or the shopping habits of shopper(s) shopping in the retail environment. In response to determining the action(s) and/or shopping habits, the retailer or processor 120 may change the pricing and/or advertisements within the retail environment based on shopping habits of the shopper(s).

Figure 3A:
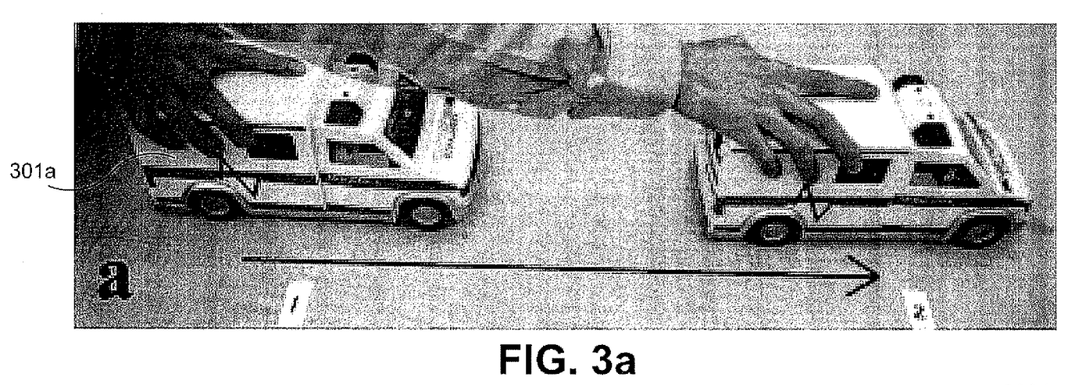
FIG. 3a shows a diagram of an exemplary motion tracking using the system of FIG. 1, according to one implementation of the present disclosure.

FIGS. 3a-3d show an example of toy ambulance 301 augmented with a wireless tag 303 on its hood, and depict different object states, which may be determined by tag processing software 140. The different states may include object 101 being still (not shown), one or more motion events, and one or more touch events. FIG. 3a shows a diagram of an exemplary motion tracking using the system of FIG. 1, according to one implementation of the present disclosure. As shown in FIG. 3a, object 301a is moved from starting point 1 to ending point 2 by a user. Such a motion may be interpreted as an object translation, where an object translation may include movements of object 301a with an average velocity. In some implementations, tag processing software 140 may be calibrated to recognize displacements of greater than a threshold distance as a translation motion event, such as displacement of object 301a greater than a predetermined distance, such as x cm.

Figure 3B:
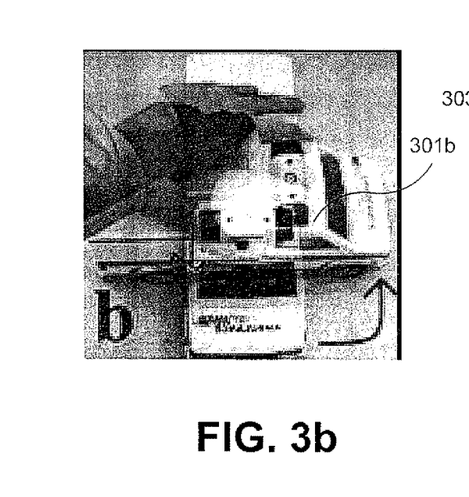
FIG. 3b shows a diagram of an exemplary motion tracking using the system of FIG. 1, according to one implementation of the present disclosure.

FIG. 3b shows a diagram of an exemplary motion tracking using the system of FIG. 1, according to one implementation of the present disclosure. Tag processing software 140 may also detect rotation, as depicted in FIG. 3b, which includes a rotation around one of the object's axes. In some implementations, tag processing software 140 may detect a rotation of about x°. In some implementations, tag processing software 140 may be calibrated to recognize rotation at greater than a defined threshold rate as a rotation event, such as a rotation of object 301b of a predetermined rotation angle.

Figure 3C:
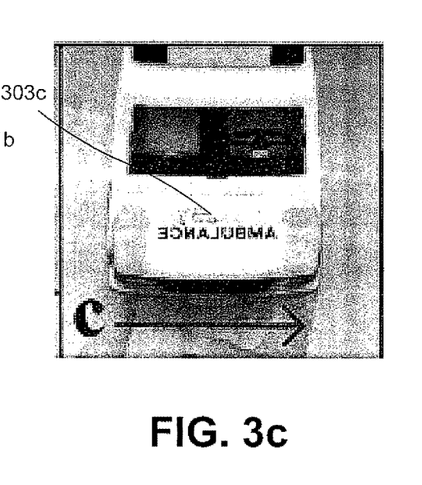
FIG. 3c shows a diagram of an exemplary swipe-touch tracking using the system of FIG. 1, according to one implementation of the present disclosure.
Figure 3D:
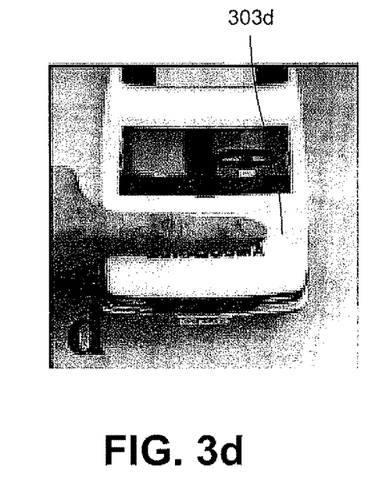
FIG. 3d shows a diagram of an exemplary cover-touch tracking using the system of FIG. 1, according to one implementation of the present disclosure.

FIG. 3c shows a diagram of an exemplary swipe-touch tracking using the system of FIG. 1, according to one implementation of the present disclosure. Swipe touch, shown in FIG. 3c, includes the user swiping their finger across the tag antenna for a predetermined amount of time, e.g. two (2) seconds. A swipe touch may be detected when a user swipes her hand across wireless tag 303c including the tag antenna. In some implementations, a swipe touch may be detected for a user swipe across wireless tag 303c including the tag antenna from left-to-right or right-to-left. FIG. 3d shows a diagram of an exemplary cover-touch tracking using the system of FIG. 1, according to one implementation of the present disclosure. In some implementations, tag processing software 140 may detect a cover touch when a user touches, covers or blocks an anathema of wireless tag 303d for a predetermined duration of time. Both the portion of the tag touched, covered or blocked, and the duration of the touch may be calibrated. The portion of wireless tag 303d a user touches, covers or blocks may be, for example, one fourth of the wireless tag, one third of the wireless tag, or any portion or the entire tag that affects transmission and/or reception via an antenna of the wireless tag.

Figure 4:
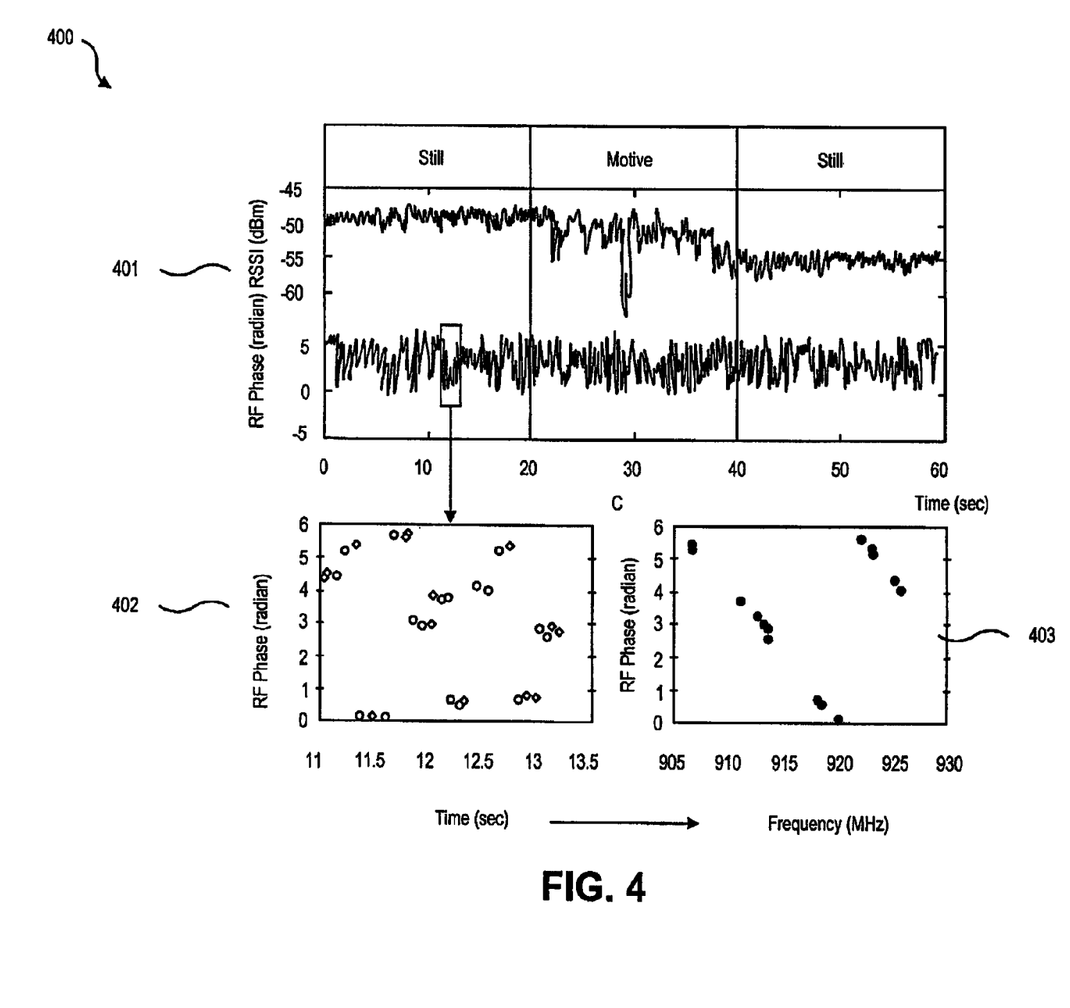
FIG. 4 shows a diagram of data collected for detecting human-object interactions using the system of FIG. 1, according to one implementation of the present disclosure.

FIG. 4 shows a diagram of data collected for detecting human-object interactions using the system of FIG. 1, according to one implementation of the present disclosure. Panel 401 of diagram 400 shows a plot of 60 seconds of raw RSSI and RF phase data associated with wireless communication channels between wireless tag 103 and wireless tag reader 105. Wireless tag 103 is "still" during the first 20 seconds, next wireless tag 103 is "moved" for twenty (20) seconds, and for the remaining twenty (20) seconds, wireless tag 103 is "still". The motions of wireless tag 103 can be inferred from the RSSI data, but the phase data does not show a discernable trend, due to FCC regulations that require RFID readers in the 915 MHz ISM band to pseudo-randomly change their transmit frequency in order to minimize interference with other devices. The result is that the RFID reader must perform a frequency hop across fifty (50) channels from 902 MHz to 928 MHz at an interval of approximately 0.2 seconds, which causes significant discontinuities in the RF phase reported by wireless tag reader 105 as a function of time (see panel 402), which may make detecting movements of wireless tag 103 difficult. However, wireless tag reader 105 may also report which channel or frequency was used when wireless tag 103 is read. Thus, re-mapping the window of the RF phase data from time into transmitted frequency (as shown in panel 403 in FIG. 4) reveals well-defined structures that can be used to build classification features.

It should be noted that the wireless communication channel parameters monitored by wireless tag reader 105, such as RSSI, RF phase, Doppler shift, and read rate, represent a snapshot of the RF environment that is unique to each wireless tag. Each wireless tag's RF environment includes a far-field signal path from the wireless tag reader 105 to the wireless tag, including all multipath elements, as well as the objects within the near-field region of the tag, which may have an effective radius around the tag of about a half wavelength. Thus, any changes in distance and/or wireless tag orientation may result in altering the signal paths and may be reported as changes in RSSI and/or RF phase. By watching the change in these parameters over time, the state of an individually tagged object can be inferred. Furthermore, changes in the near-field region of the tag (such as hand touch) may alter the resonant frequency of wireless tag 103, and/or the impedance match between the RFID IC and the antenna. Both of these effects may be reported as changes in RSSI and RF phase as reported by wireless tag reader 105.

Figure 5:
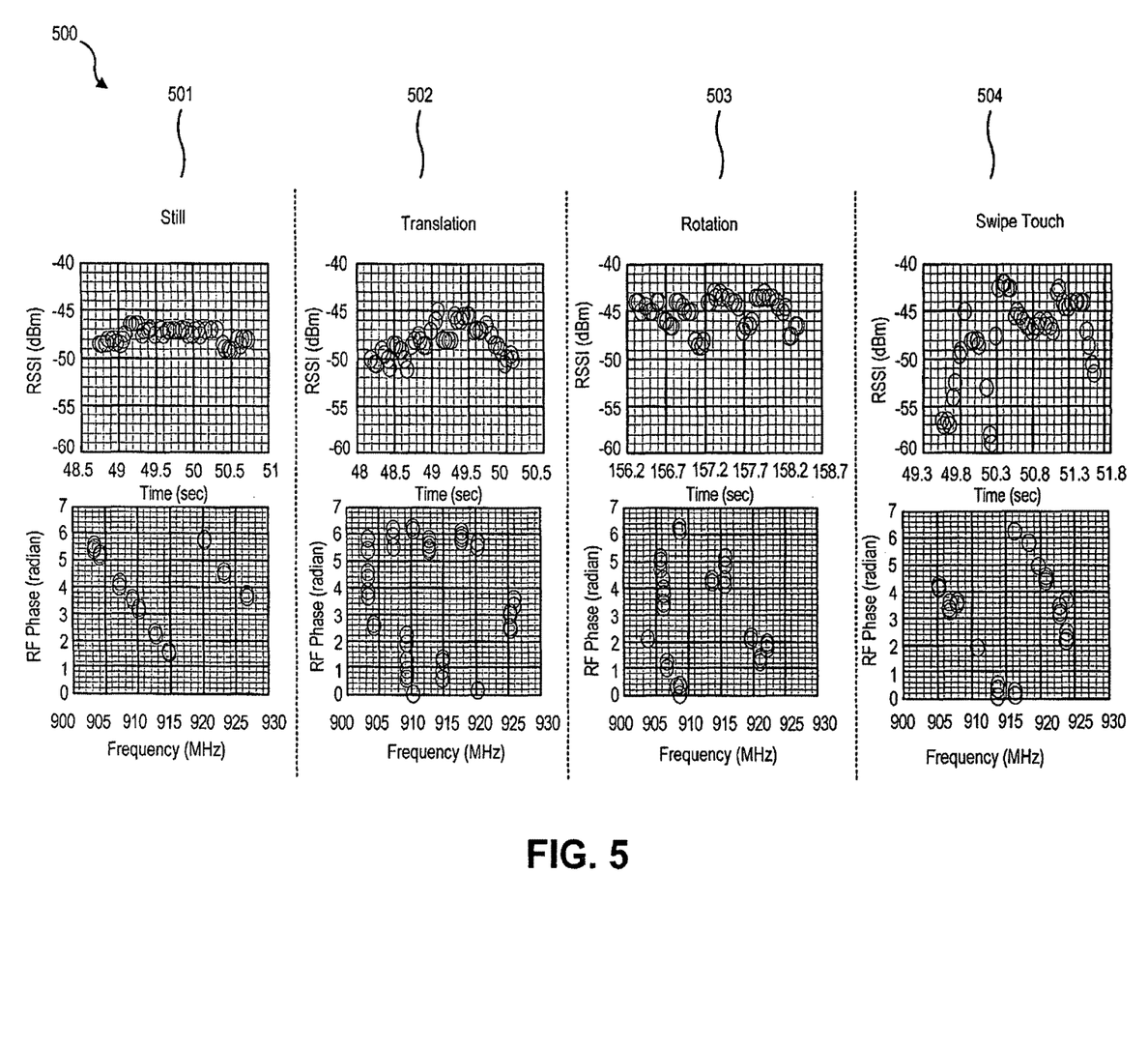
FIG. 5 shows a diagram of data collected for detecting human-object interactions using the system of FIG. 1, according to one implementation of the present disclosure.

FIG. 5 shows a diagram of data collected for detecting human-object interactions using the system of FIG. 1, according to one implementation of the present disclosure. Diagram 500 shows examples of the raw RSSI and RF phase signals for the same object undergoing four different types of interactions. Panel 501 shows a still tag (i.e., no human interaction) with the RSSI vs. time plot on the top and the RF phase vs. transmit frequency plot on the bottom. The RSSI vs. time plot is relatively stable for a two second time window and the RF phase vs. frequency plot shows RF phase decreasing at a constant slope. As shown in panels 502 and 503, translation and rotation, respectively, may have a significant influence on RF Phase variation. Additionally, swipe touch, shown in panel 504, may have a significant influence on RSSI variation. In some implementations, to minimize the influence of RF signal multipath effect, tag processing software 140 may calculate results on changes in RSSI and RF Phase, rather than absolute values of RSSI and RF Phase. To infer the user interaction with object 101, tag processing software 140 may consider various of RSSI, RF Phase, and read rate, such as the standard deviation of RSSI, the mean of RSSI standard deviation within each frequency, the mean of the difference between neighboring RSSI, the median of the CFPR, the sum of the absolute values of CFPR, the standard deviation of the CFPR, the standard deviation of the Variable Frequency Phase Rate (VFPR), the Read Rate, and the number of packets received from each wireless tag per second.

Figure 6A:
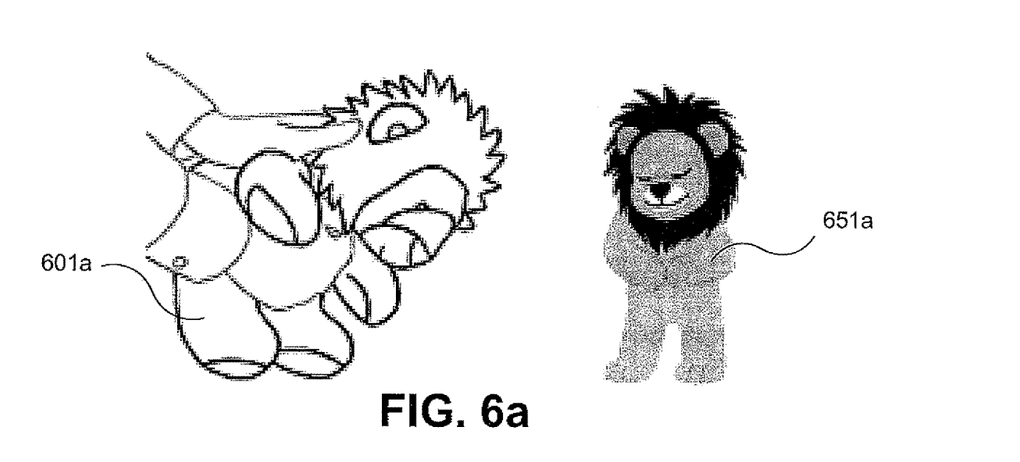
FIG. 6a shows an exemplary human-object interaction as input for an interactive media device, according to one implementation of the present disclosure.
Figure 6B:
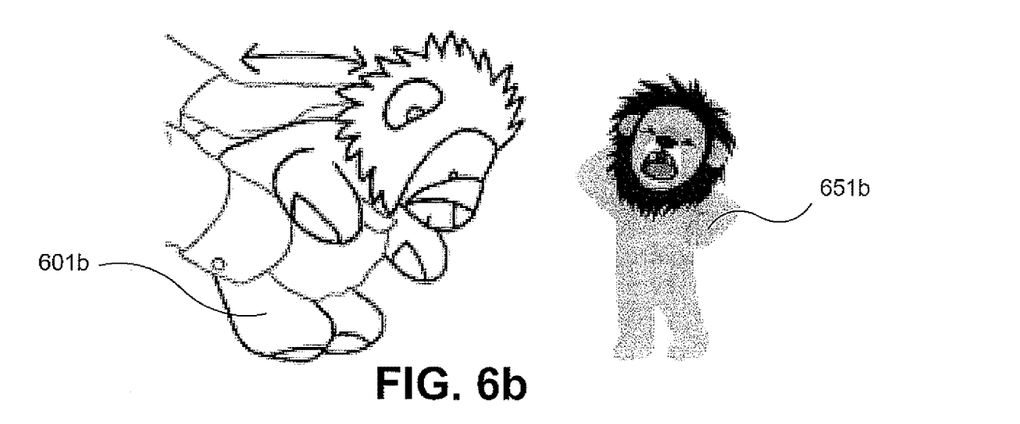
FIG. 6b shows an exemplary human-object interaction as input for an interactive media, according to one implementation of the present disclosure.
Figure 6C:
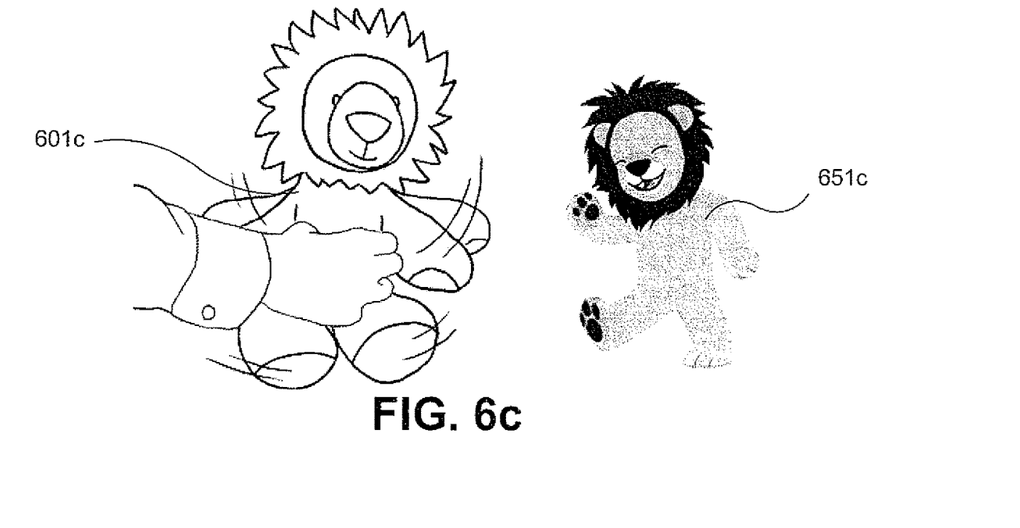
FIG. 6c shows an exemplary human-object interaction as input for an interactive media, according to one implementation of the present disclosure.

FIGS. 6a-6c show examples where interaction with real toy lion 601, such as petting, holding, and shaking, may be used as input to an interactive media device and may affect the actions of virtual toy lion 651. In some implementations, interactions with toy lion 601 may be used as input to affect a story and/or plot events. FIG. 6a shows an exemplary human-object interaction as input for an interactive media device, according to one implementation of the present disclosure. As shown in FIG. 6a, when the user covers the collar of toy lion 601a, the cover touch of wireless tag 103 (not shown) on the collar may be used as input for an interactive media device. For example, the cover touch may cause virtual lion 651a to take a nap.

FIG. 6b shows an exemplary human-object interaction as input for an interactive media device, according to one implementation of the present disclosure. As shown in FIG. 6b, when the user swipes across the collar of toy lion 601b, the swipe touch of wireless tag 103 (not shown) may be used as input for an interactive media device. For example, the swipe touch may be interpreted as petting toy lion 601b, and virtual lion 651b on the display may appear soothed. FIG. 6c shows an exemplary human-object interaction as input for an interactive media device, according to one implementation of the present disclosure. FIG. 6c depicts the user shaking real lion 601c, which may be taken as input causing virtual lion 651c to dance. In some implementations, a user interaction with real lion 601 may advance a plot line of a story and may be used to trigger visual and audio feedback on the interactive media device. Additionally, because each wireless tag provides a unique wireless tag ID, multiple toys may be used simultaneously to create complex and dynamic stories. In some implementations, each toy may be personalized based on previous story lines or user's preferences using a database or a writeable memory in wireless tag 103.

Figure 7:
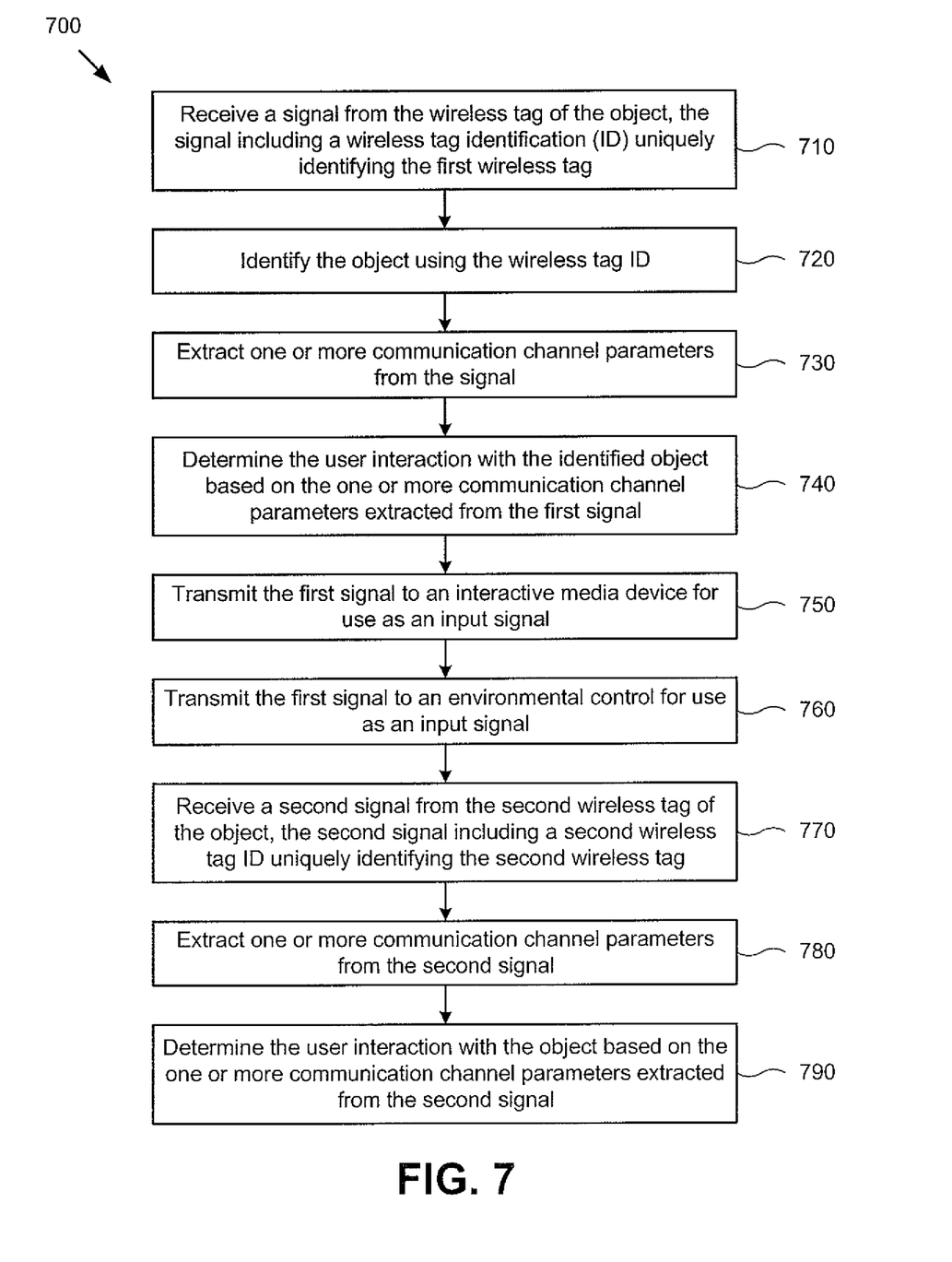
FIG. 7 shows a flowchart illustrating an exemplary method of detecting human-object interactions, according to one implementation of the present disclosure.

FIG. 7 shows a flowchart illustrating an exemplary method of detecting human-object interactions, according to one implementation of the present disclosure. Flowchart 700 begins at 710, where tag processing software 140 receives a signal from wireless tag 103 of object 101, the signal including a wireless tag identification (ID) uniquely identifying wireless tag 103. In some implementations, wireless tag reader 105 may be capable of reporting channel parameters such as Received Signal Strength Indicator (RSSI), RF phase, and Doppler shift, as well as the unique wireless ID of each wireless tag. In some implementations, wireless tag reader 105 may interrogate a plurality of wireless tags within its range, for example, according to the ISO-18000-6C specification, based on the Slotted Aloha protocol.

In some implementations, wireless tag reader 105 may read wireless tag 103 at a rate of about 90 reads/second, and a population of 10 wireless tags at a rate of about 330 reads/sec., with each individual wireless tag of the plurality of wireless tags reading at a rate of about 30 reads/sec. In some implementations, wireless tag reader 105 may monitor and/or track a plurality of wireless tags, including wireless tag 103, in an area. Wireless tag reader 105 may programmatically mask a sub-population of the plurality of tags in the area to avoid significantly reduced read rates for each tag that may result from a large number of wireless tags in the area.

At 720, tag processing software 140 identifies object 101 using the wireless tag ID. In some implementations, wireless tag reader 105 may be capable of reporting a unique wireless tag ID of wireless tag 103. In some implementations, tag processing software 140 may include a database storing a plurality of wireless tag IDs, and each wireless tag ID may correspond to an object. In some implementations, a wireless tag ID may uniquely correspond to object 101; however, in other implementations, two or more wireless tag IDs may be associated with object 101.

At 730, tag processing software 140 extracts one or more communication channel parameters from the signal received from wireless tag 103. In some implementations, wireless tag reader 105 may be capable of reporting channel parameters such as RSSI, RF phase, and Doppler shift, as well as the unique wireless tag ID of each tag. For example, to retrieve the data streams including the channel parameters extracted from the received signal, system 100 may utilize a reader communication software in C# using Octane SDK provided by IMPINJ®. In some implementations, the channel parameters reported by wireless tag reader 105 may represent a unique signature of the RF environment of wireless tag 103. Each time a tag is read, wireless tag reader 105 may measure these physical layer channel parameters and report them along with the wireless tag ID and the transmit frequency to tag processing application 140. By observing changes in these parameters over time, inferences can be made about the state of the tag and thus object 101 to which wireless tag 103 is attached. By observing these interaction events over time, system 100 may enable a wide variety of applications such as inference of daily activities in the home, interactive storytelling using real toys with computer-based interactive media, and enhanced retail experiences where interactions with tagged merchandise may be used to determine customer interests.

RSSI Features

RSSI is a measurement of the signal power received at wireless tag reader 105 and may be predominantly affected by changes in the distance between wireless tag 103 and wireless tag reader 105. In some implementations, changes in RSSI may be predominantly caused by changes in the distance between wireless tag reader 105 and wireless tag 103 as well as the orientation of wireless tag 103. However, it is well known that multipath effects can cause unpredictable variations in signal strength between a transmitter and receiver. In real-world settings, multipath increases the spatial variation in RSSI and thus providing a greater likelihood of detecting motion events. Tag processing software 140 may identify changes in Standard Deviation of RSSI, Mean of RSSI Standard Deviation within each frequency, and Mean of difference between neighboring RSSI to detect motion events using RSSI.

RF Phase Features

RF phase is a measure of the phase angle between the RF carrier transmitted by wireless tag reader 105 and the return signal from the tag. RF phase may be affected by small changes in distance between wireless tag 103 and wireless tag reader 105 and/or in carrier frequency, and may repeat every wavelength. RF phase may be sensitive to smaller changes in distance between the wireless tag 103 and wireless tag reader 105 and may be particularly useful for detecting translational motion. Additionally, the frequency hopping effect demonstrates RF Phase dependency on channel frequency, which results in the phase related features being divided into two subgroups: the Constant Frequency Phase Rate (CFPR) and the Variable Frequency Phase Rate (VFPR). Since wireless tag reader 105 performs many tag reads on a single frequency before hopping to the next channel, changes in the RF phase may be a good indicator of an interaction event. The CFPR may be defined as:

$$CFPR = Phase[i+1] - Phase[i] \quad (1)$$

where Phase [i+1] and Phase [i] are neighboring RF phase measurements at the same frequency within a given time window. Tag processing software 140 may use Median of the CFPR, Sum of the absolute values of CFPR, and Standard Deviation of the CFPR to represent variations of CFPR caused by human interaction with wireless tag 103.

When wireless tag reader 105 does frequency hop from one channel to another, the change in frequency adds an additional dimension of information to infer human-object interaction. Equation (2) shows that the distance between wireless tag reader 105 and wireless tag 103 is proportional to the partial derivative of the phase with respect to the derivative of frequency.

$$d = -\frac{c}{4\pi} \frac{\partial \varphi}{\partial f} \quad (2)$$

Therefore, the VFPR is defined in equation (3) as the incremental change in phase divided by the incremental change in frequency.

$$VFPR = \frac{Phase[i+1] - Phase[i]}{Frequency[i+1] - Frequency[i]} \quad (3)$$

Finally, since VFPR is proportional to the distance between wireless tag 103 and wireless tag reader 105, tag processing software 140 may use the standard deviation of VFPR determine tag motion. In some implementations, tag processing software 140 may measure the standard deviation of the VPFR.

Read Rate Per Tag

Read rate of wireless tag 103 may be the number of times each second that wireless tag reader 105 is able to read wireless tag 103, such as the number of packets received from wireless tag 103 per second. A cover touch event on wireless tag 103 may significantly weaken the received signal strength, which may result in a decreased read rate. For example, read rate of wireless tag 103 when uncovered may range from 15 to 40 reads per second, while the read rate when wireless tag 103 is partially or fully covered may be less than about 10 reads per second.

Doppler Features

Doppler shift may be the frequency shift between the signal transmitted by wireless tag reader 105 and a reflected signal, and may be caused by quickly moving objects. Doppler shift may be used in a number of radio sensing scenarios to infer the relative motion of two radio systems. It should be noted that RFID-based Doppler shift features may be useful in scenarios involving fast moving objects, such as outdoor sporting activities and automotive settings.

At 740, tag processing software 140 determines the user interaction with the identified object based on the one or more communication channel parameters extracted from the first signal. In some implementations, tag processing software 140 may be trained on a plurality of human-object interactions, and those interactions may be classified as movement events and touch events. One of the advantages of classifying move and touch events is that the classifier may be generalized to multiple users, and the same classifier may be used for a plurality of objects. In some implementations, the training process may require a single participant to record training data for various human-object interactions. In some implementations, performance may be increased retraining the classifier for each usage scenario.

In some implementations, tag processing software 140 may be able to detect horizontal translation greater than about 20 centimeters in distance, vertical translation greater than about 10 centimeters, and rotation of more than about 45 degrees; all in a two-second window. Tag processing software 140 may combine rotation and translation classes into one "motion class". The final classifier may detect human interaction with wireless tag 103 including still, motion, swipe touch and cover touch. In some implementations, tag processing software 140 may generate classifier reports results once per second for each wireless tag, which may be accomplished by sliding a window over the data stream.

At 750, tag processing software 140 transmits an input signal to an interactive media device based on the first signal. In some implementations, an interactive device may include a computer, tablet computer, a smart phone, or other interactive media device suitable for executing an interactive application such as an interactive storytelling application. When a child plays with a real toy having wireless tag 103 attached, interaction events may be recorded by tag processing software 140 and transmitted as an input signal to an interactive media device. The input signal may trigger actions by a virtual character on a display screen of the interactive media device. For instance, when object 10l is a toy lion with wireless tag 103 attached on the lion's collar, a swipe touch near the collar may be interpreted as petting the lion, while a cover touch may trigger the digital character on the interactive media device to take a nap. Likewise shaking the lion may cause the digital character to dance. Any of these actions may advance a plot line of a story and be used to trigger visual and audio feedback on the interactive media device. In some implementations, multiple toys may be used simultaneously with the interactive media device to create complex and dynamic stories. Additionally, each toy may be personalized based on previous story lines or a user's preferences using a database or the writeable memory in wireless tag 103. Ultimately, tag processing software 140 may offers an unobtrusive way to bridge interactive digital media with real-world toys and objects.

At 760, tag processing software 140 transmits an input signal to an environmental control based on the first signal. An environmental control may include a thermostat, a light control system, an automated window shade system, an audio system, or other system that a user may use to control the user's environment. When the user interacts with wireless tag 103, such as by a swipe touch or a cover touch, tag processing software 140 may send the received signal to the environmental system to activate an environmental control. For example, object 101 may be a reading book having wireless tag 103 attached to a cover, and a user may sit to read the book but want the lighting to be brighter. The user may swipe wireless tag 103 in a direction that is designated to increase or decrease the level of light in the room, and tag processing software 140 may transmit the signal to a light control system to adjust the lights accordingly. In other implementations, wireless tag 103 may be used to turn on a reading light, for example, when wireless tag 103 is attached to the cover of a book, and a cover touch signal may be used to activate reading lights when the book is opened or closed. Similarly, wireless tag 103 may be used to send an input signal to change the temperature in a room, adjust the natural lighting by opening/closing shades, increase or decrease the volume of an audio system in the room, or similar changes using some other environmental control system.

At 770, tag processing software 140 receives a second signal from the second wireless tag of the object, the second signal including a second wireless tag ID uniquely identifying the second wireless tag. In some implementations, object 101 may have more than one wireless tag attached, including wireless tag 103 and at least one other wireless tag. Each wireless tag may have a unique tag ID, and tag processing software 140 may search the database of wireless tags and objects to identify the second wireless tag and the object to which it is attached. Flowchart 700 continues at 780, where tag processing software 140 extracts one or more communication channel parameters from the second signal, which may include RRSI, RF phase, Doppler shift, and read rate information. At 790, tag processing software 140 determines the user interaction with the object based on the one or more communication channel parameters extracted from the second signal.

Since the tag processing software 140 is easy to train and deploy, tag processing software 140 may be used to enable novel interaction detection applications. Other contemplated applications include seat occupancy detection and gross posture estimation. For example, wireless tags on a seat surface may be utilized to detect occupancy by sensing cover touch. Wireless tags on the seat back and armrest may be used to sense a leaning back posture and resting arm posture, enabling gross posture detection.

Additional uses may include infrastructure monitoring, where wireless tags may be used to infer the state of the environment. For example, wireless tags placed on fixed infrastructure, such as doors, floors, and windows, may be used for motion tracking for security scenarios. Furthermore, wireless tags may be integrated into objects as sensors, where the motive or still states of mechanical methods can be inferred by monitoring RSSI and RF Phase features.

Tag processing software 140 demonstrates good performance for multi-tag applications and the usage scenario should be designed to mitigate object-to-object and object-to-human interference. However, due to the diversity of human behavior, unintended interactions may be recorded. For instance, when humans walk between the reader antenna and object 101 (or block most of the RF paths to tag 103) it is possible to create false interaction events. Thus, choosing good antenna placement may improve system performance. In some implementations, wireless tag reader 105 antennas placed in the ceiling of a room provide a good balance between wireless tag reader 105 coverage area and reduction of human signal blocking events. Other approaches, such as wireless tag reader 105 including multiple antennas and the use of fixed reference tags that help calibrate the system may provide additional improvements.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for determining an interaction of a user with an object based on a state of the object having a wireless tag with an antenna for reading by a wireless tag reader, the system comprising:
 a memory storing a tag processing software; and
 a hardware processor executing the tag processing software to:

receive, from the wireless tag reader over a period of time, a plurality of signals from the wireless tag of the object via the antenna, each signal of the plurality of signals being for a successful read of the wireless tag, each signal of the plurality of signals including a wireless tag identification (ID) uniquely identifying the wireless tag;

identify the object using the wireless tag ID;

determine, over the period of time, wireless channel parameters based on the plurality of signals, the wireless channel parameters including a signal strength indicator (RSSI) of each signal of the plurality of signals, a read rate of the plurality of signals, and an RF phase of each signal of the plurality of signals;

classify, based on analyzing the RSSI of the plurality of signals, the read rate of the plurality of signals, and the RF phase of the plurality of signals over the period of time, the state of the object as one of still, moving, and rotating; and determine the user interaction with the object based on the state of the object, the user interaction including keeping the object still, moving the object, rotating the object, and covering the object;

wherein the read rate corresponds to a number of successful reads of the wireless tag over the period of time; and wherein the covering of the object is determined based on the read rate of the wireless tag over the period of time being less than a predetermined number over the period of time.

2. The system of claim 1, wherein the hardware processor executes the tag processing software to further classify, based on analyzing the RSSI, the read rate and the RF phase, the state of the object as one of still, moving, rotating and being swipe touched.

3. The system of claim 1, wherein the hardware processor executes the tag processing software to further:

determine a Doppler shift of each signal of the plurality of signals over the period of time; and classify, based on analyzing the RSSI, the RF phase, the Doppler shift and the read rate, the state of the object as one of still, moving, rotating, being swipe touched, quick motion and being cover-touched.

4. The system of claim 1, wherein the object is one of a household item, a toy, and a retail merchandise.

5. The system of claim 1, wherein the object is a retail merchandise and the user is a shopper in a retail environment, and wherein the hardware processor is further configured to:

determine the interaction of the shopper in the retail environment based on the plurality of signals; and modify a pricing or an advertisement in the retail environment, in response to the the interaction.

6. The system of claim 1, wherein the user interaction includes an input signal for an interactive media device, and wherein the hardware processor is further configured to:

transmit the input signal to the interactive media device based on the user interaction.

7. The system of claim 1, wherein the user interaction includes an input signal for an environmental control, and wherein the hardware processor is further configured to:

transmit the input signal to the environmental control based on the user interaction.

8. A method of determining an interaction of a user with an object based on a state of the object having a wireless tag with an antenna for reading by a wireless tag reader, the method using a system having a memory storing a tag processing software and a processor executing the tag processing software, the method comprising:

receiving, from the wireless tag reader over a period of time using the processor, a plurality of signals from the wireless tag of the object via the antenna, each signal of the plurality of signals being for a successful read of the wireless tag, each signal of the plurality of signals including a wireless tag identification (ID) uniquely identifying the wireless tag;

identifying, using the processor, the object using the wireless tag ID;

determining, using the processor and over the period of time, wireless channel parameters based on the plurality of signals, the wireless channel parameters including a signal strength indicator (RSSI) of each signal of the plurality of signals, a read rate of the plurality of signals, and an RF phase of each signal of the plurality of signals;

classifying, using the processor, based on analyzing the RSSI of the plurality of signals, the read rate of the plurality of signals, and the RF phase of the plurality of signals over the period of time, the state of the object as one of still, moving, and rotating; and determine, using the processor, the user interaction with the object based on the state of the object, the user interaction including keeping the object still, moving the object, rotating the object, and covering the object;

wherein the read rate corresponds to a number of successful reads of the wireless tag over the period of time; and wherein the covering of the object is determined based on the read rate of the wireless tag over the period of time being less than a predetermined number over the period of time.

9. The method of claim 8, wherein the classifying classifies, based on analyzing the RSSI, the read rate and the RF phase, the state of the object as one of still, moving, rotating and being swipe touched.

10. The method of claim 8 further comprising:

determine a Doppler shift of each signal of the plurality of signals over the period of time, wherein the classifying classifies, based on analyzing the RSSI, the RF phase, the Doppler shift and the read rate, the state of the object as one of still, moving, rotating, being swipe touched, quick motion and being cover-touched.

11. The method of claim 8, wherein the object is one of a household item, a toy, and a retail merchandise.

12. The method of claim 8, wherein the object is a retail merchandise and the user is a shopper in a retail environment, and wherein the method further comprises:

determining the interaction of the shopper in the retail environment based on the plurality of signals; and modifying a pricing or an advertisement in the retail environment, in response to the interaction.

13. The method of claim 8, wherein the user interaction includes an input signal for an interactive media device, and wherein the method further comprises:

transmitting, by the processor, the input signal to the interactive media device based on the user interaction.

14. The method of claim 8, wherein the user interaction includes an input signal for an environmental control, and wherein the method further comprises:

transmitting, by the processor, the input signal to the environmental control based on the user interaction.

* * * * *